United States Patent
Kim

(10) Patent No.: US 6,173,010 B1
(45) Date of Patent: Jan. 9, 2001

(54) METHOD FOR INITIALIZING APPARATUS FOR TRANSFERRING ASYMMETRICAL DATA

(75) Inventor: Heung-soo Kim, Ansan (KR)

(73) Assignee: Samsung Electronics Co., Ltd., Kyungki-do (KR)

( * ) Notice: Under 35 U.S.C. 154(b), the term of this patent shall be extended for 0 days.

(21) Appl. No.: 09/045,146

(22) Filed: Mar. 20, 1998

(30) Foreign Application Priority Data

Mar. 21, 1997 (KR) .................................................. 97-11827

(51) Int. Cl.⁷ ...................................................... H04B 1/38
(52) U.S. Cl. ............................ 375/220; 375/222; 375/259
(58) Field of Search ................................. 375/220, 222, 375/224, 257, 259; 714/15, 21

(56) References Cited

U.S. PATENT DOCUMENTS

| | | | |
|---|---|---|---|
| 5,794,254 | * 8/2000 | McClain | 707/204 |
| 5,870,438 | * 2/1999 | Olafsson | 375/344 |
| 6,064,692 | * 5/2000 | Chow | 375/219 |
| 6,101,585 | * 8/2000 | Brown et al. | 711/162 |

FOREIGN PATENT DOCUMENTS

| | | | |
|---|---|---|---|
| 4-271557 | 9/1992 | (JP) | H04M/11/00 |
| 5-284321 | 10/1993 | (JP) | H04N/1/32 |
| 9-51328 | 2/1997 | (JP) | H04L/7/00 |

OTHER PUBLICATIONS

Nikkei Electronics, No. 676, Nikkei BP Company, Nov. 18, 1996, pp. 89–108.

* cited by examiner

*Primary Examiner*—Stephen Chin
*Assistant Examiner*—Dac V. Ha
(74) *Attorney, Agent, or Firm*—Sughrue, Mion, Zinn, Macpeak & Seas, PLLC

(57) ABSTRACT

A method is provided for initializing an apparatus for transferring asymmetrical data, in which initializing time is reduced using a previously stored result. The method includes the steps of (a) determining whether data bit assignment tables assigning data based on the channel characteristics of the transfer line are effective and (b) transferring data based on stored characteristics of the transfer line without reanalyzing, when the data bit assignment tables are determined to be effective in step (a).

4 Claims, 3 Drawing Sheets

METHOD FOR INITIALIZING APPARATUS FOR TRANSFERRING ASYMMETRICAL DATA

BACKGROUND OF THE INVENTION

1. Field of the Invention

The present invention relates to a system and a method for initializing an apparatus for transferring asymmetrical data, and more particularly, to a system and method for reducing initialization time of an apparatus used for transferring asymmetrical data using previously stored characteristics of the transfer line.

2. Description of the Related Art

A system for transferring asymmetrical data is used as part of a high speed MODEM having a transferring speed of at least 9,600 bps. The bandwidth of a telephone line—connected to the MODEM—is divided into a low speed communication line and a high speed communication line, which are both asymmetrical communication lines. Initially, data is transferred at a speed of about 300–450 bps in the low speed communication line and later at a speed of at least 9,600 bps in the high speed communication line. The data is received and transferred simultaneously by the above mentioned division of the bandwidth into two.

FIG. 1 is a block diagram of a system for transferring asymmetrical data. A mother apparatus 100 is connected to a child apparatus 102 by a telephone line 101. The mother apparatus receives digital data from and transfers data to the child apparatus 102. In this example, the mother apparatus 100 is installed in a telephone office. The child apparatus 102 is installed in a subscriber's home. occasionally data transfer may be affected by an interruption in the power supply to the mother apparatus 100 or the telephone line 101. In such a case, the apparatus for transferring asymmetrical data shown in FIG. 1 is initialized. The initialization takes place after the interruption ceases.

FIG. 2 is a flowchart showing a conventional method of initializing the apparatus shown in FIG. 1. In this flowchart, a transfer line uses a frequency band between 30–1104 kHz which has been divided into 248 sub-channels (4.3125 kHz per sub-channel) to transmit data between a mother and a child apparatus.

In step 220 the telephone line is optimized by the mother apparatus 100 transferring a test signal to the child apparatus 102, as part of a basic communication. In step 230, the attenuation of the noise and signal in each of the 248 sub-channels constituting the frequency band is analyzed. In step 240, 0–15 data bits to be transferred are assigned to each of the sub-channels using the analysis made in the step 230. In step 250, the assigned data bits are transferred to the child apparatus 102—thereby performing a normal communication.

In the above-mentioned initialization process of FIG. 2, unnecessary time is consumed since the characteristics of the frequency band, used to transmit data on the transfer line, are examined during every initialization after an interruption.

SUMMARY OF THE INVENTION

It is an object of the present invention to provide a system and a method for initializing an apparatus for transferring asymmetrical data using the characteristics of the transfer line known a priori, instead of reanalyzing the characteristics of the transfer line in the case where characteristics of the transfer line are expected to remain unchanged.

In order to achieve the above object, the method for initializing an apparatus for transferring asymmetrical data on a transfer line using a frequency band according to the present invention comprises: (a) determining whether data bit assignment tables assigning data based on the channel characteristics of the transfer line are effective and (b) transferring data based on stored characteristics of the transfer line without reanalyzing, when the data bit assignment tables are determined to be effective in step (a).

Another aspect of this invention is a system for initializing an apparatus for transferring asymmetrical data using a transfer channel comprising a frequency band comprising a microprocessor and a RAM, wherein the microprocessor determines whether data bit assignment tables stored in the RAM is effective after an interruption in communication based on the presence of corrected records in specific areas of the data bit assignment tables, wherein further communication is based on the data bit assignment tables when they are determined to be effective, and wherein the transfer line is reanalyzed to create new data bit assignment tables when the data bit assignment tables are not effective and said new data bit assignment tables are used for further communication.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENTS

Hereinafter, a preferred embodiment of the present invention will be described with reference to the attached drawings.

Figure 1:
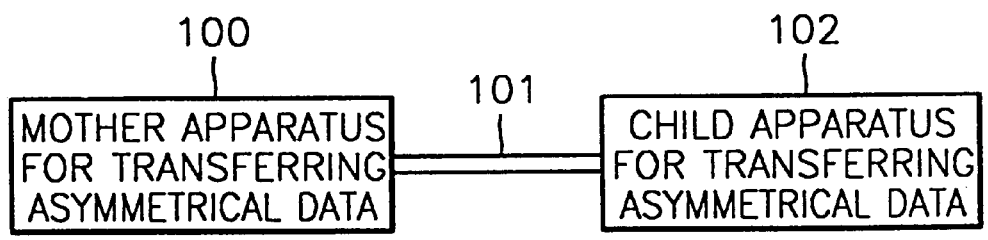
FIG. 1 is a block diagram of a general apparatus for transferring asymmetrical data.
Figure 2:
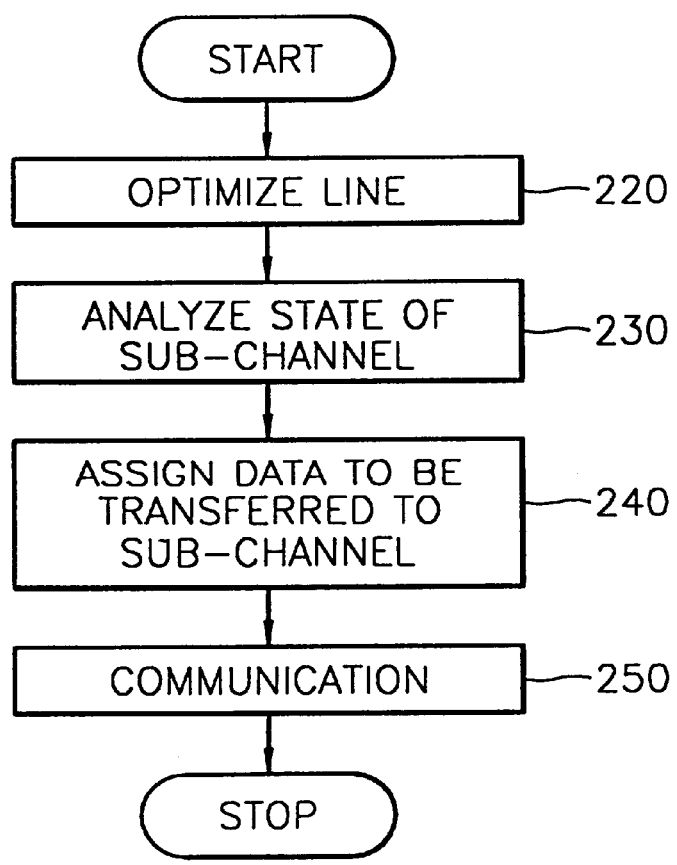
FIG. 2 is a flowchart showing the process of initializing the apparatus shown in FIG. 1.
Figure 3:
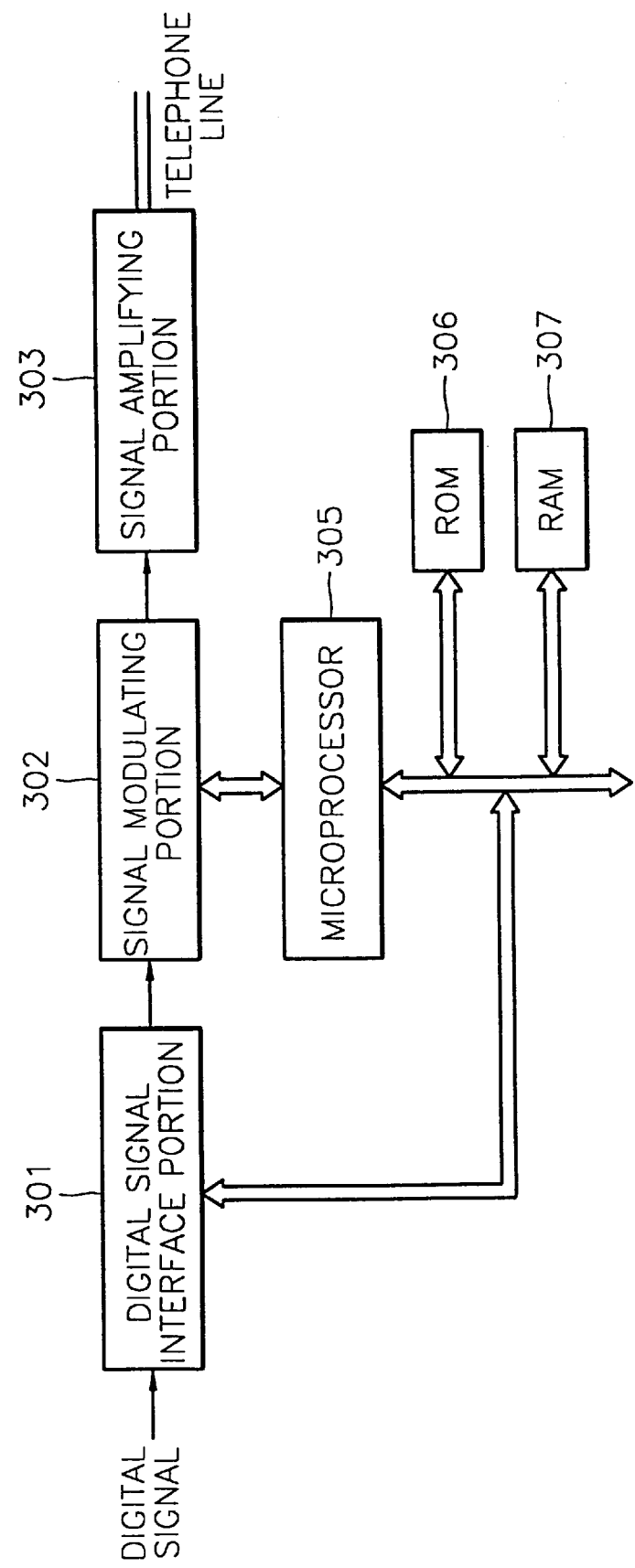
FIG. 3 is a block diagram of a mother apparatus for transferring asymmetrical data.

Referring to FIG. 3, the mother apparatus for transferring asymmetrical data includes a digital signal interfacing portion 301 for interfacing with an input digital signal, a signal modulating portion 302 for modulating a signal output from the digital signal interfacing portion 301, a signal amplifying portion 303 for amplifying the modulated signal output from the signal modulating portion 302 and applying it to the telephone line, a microprocessor 305 for controlling the other parts of the apparatus, a read only memory (ROM) 306 for storing a program for controlling the operation of the microprocessor 305, and a random access memory (RAM) 307 for storing a data bit assignment table and for temporarily storing data from the digital signal contacting portion 301 and the microprocessor 305.

Figure 4:
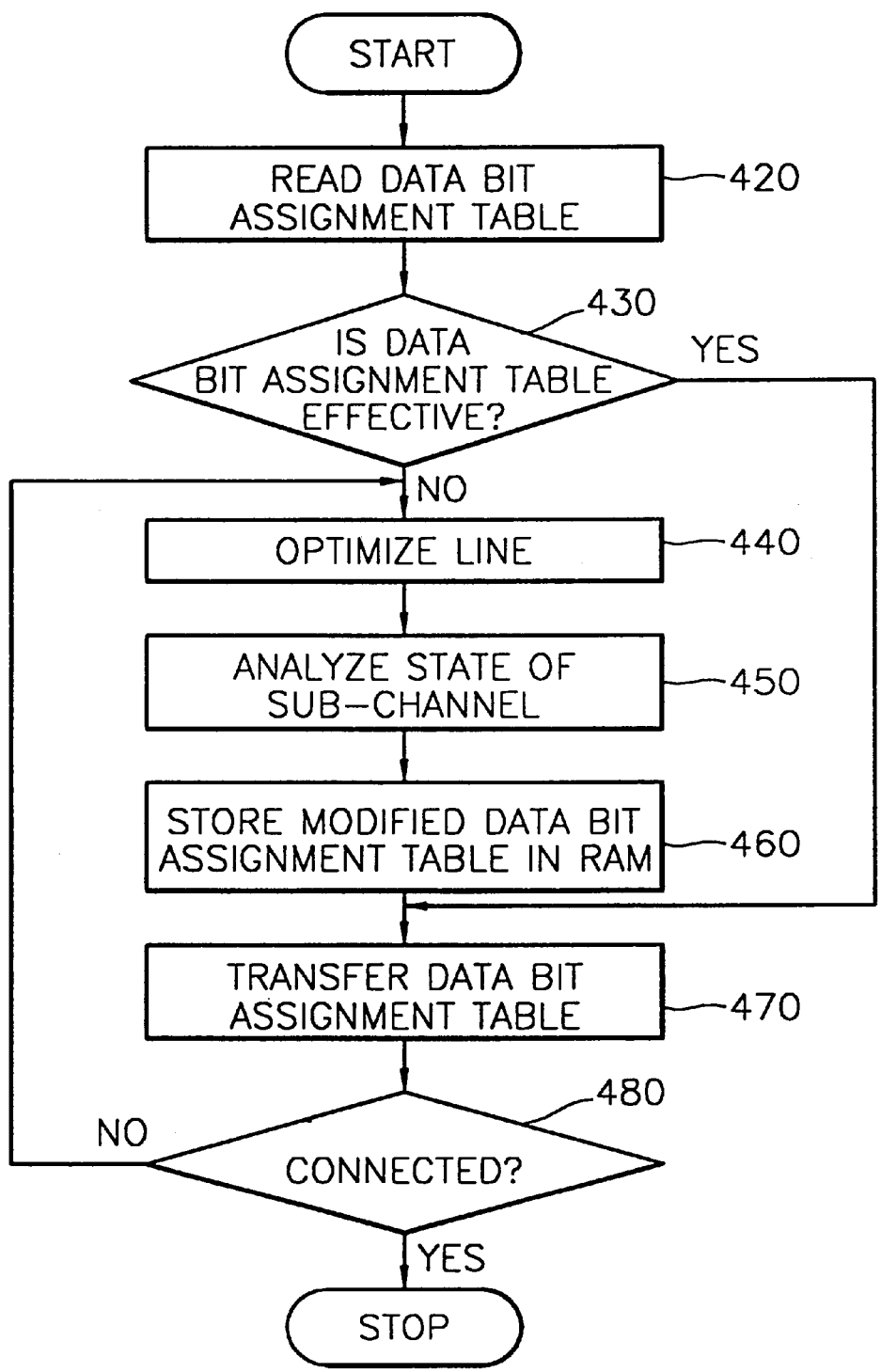
FIG. 4 is a flowchart showing the method for initializing an apparatus for transferring asymmetrical data according to the present invention.

The operation of the present invention will be described as follows, referring to the block diagram of FIG. 3 and the flowchart of FIG. 4.

The following initializing process is performed after an interruption in communication due to a failure in the power supply to the mother apparatus 100 or due to a fault in the telephone line 101.

First, the microprocessor 305 reads the data bit assignment table assigning data corresponding to the characteristics of the sub-channels of the telephone line from the RAM (step 420) and determines whether the data bit assignment tables are effective, (step 430). Here, the effectiveness is determine by the microprocessor 305 by confirming the existence of corrected records in specific areas of the data bit assignment tables. The data bit assignment tables having corrected records is determined to be effective. Accordingly, it is determined that the characteristics of the transfer line are not changed.

When corrected records do not exist in the specific areas of the data bit assignment tables, namely, when the data bit assignment tables are not effective, the microprocessor 305 transfers a test signal to the child apparatus 102, through the signal modulating portion 302 in the mother apparatus 100, and optimizes the transfer line (step 440). The microprocessor 305 analyzes the attenuation of the noise and signal of each of the 248 sub-channels, constituting the frequency band, in the optimized line(step 450).

Based on the above analysis, 0–15 bits are allocated to be transferred through the 248 sub-channels. This information is used to create new data bit assignment tables. The microprocessor 305 stores the data bit assignment tables in the RAM 307 (step 460). It then transfers the data bit assignment tables to the child apparatus 102, and then begins normal communication (step 470).

When the microprocessor 305 determines that the data bit assignment tables are effective (step 430), the characteristics of the transfer line are not reanalyzed and the data bit assignment tables in which the characteristics of the previous transfer line are stored is transferred (step 470). Also, the microprocessor 305 determines whether the contact to the child apparatus 102 for transferring asymmetrical data is completed. If not, the process returns to the step 440.

According to the present invention, it is possible to reduce waiting time by simplifying the process for initializing the apparatus for transferring asymmetrical data, thereby improving performance.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for initializing an apparatus for transferring asymmetrical data on a transfer line, the method comprises:

(a) determining whether data bit assignment tables assigning data corresponding to the channel characteristics of the transfer line are effective after an interruption; and (b) transferring data based on the channel characteristics of the transfer line without reanalyzing, when the data bit assignment tables are determined to be effective in step (a).

2. The method of claim 1, wherein when the data bit assignment tables corresponding to the channel characteristics of the transfer line are not effective in step (a) the method further comprises:

(c) reanalyzing characteristics of the transfer line, (d) creating new data assignment tables based on the analysis of step (c), (e) transferring the new data assignment tables, (f) performing communication using the new data assignment tables.

3. The method of claim 1, wherein the data assignment tables of the channel is determined to be effective based on the presence of corrected records in specific areas of the data bit assignment tables.

4. A system for initializing an apparatus for transferring asymmetrical data on a transfer line using a frequency band, said system comprising:

a microprocessor; and a RAM;

wherein the microprocessor determines whether data bit assignment tables stored in the RAM is effective after an interruption in communication based on the presence of corrected records in specific areas of the data bit assignment tables, wherein further communication is based on the data bit assignment tables when they are determined to be effective, and wherein the transfer line is reanalyzed to create new data bit assignment tables when the data bit assignment tables are not effective and said new data bit assignment tables are used for further communication.

* * * * *